(12) United States Patent
Mantua

(10) Patent No.: US 9,494,278 B2
(45) Date of Patent: Nov. 15, 2016

(54) HOLSTER REST

(71) Applicant: Frank M. Mantua, Allen Park, MI (US)

(72) Inventor: Frank M. Mantua, Allen Park, MI (US)

(*) Notice: Subject to any disclaimer, the term of this patent is extended or adjusted under 35 U.S.C. 154(b) by 0 days.

(21) Appl. No.: 14/311,314

(22) Filed: Jun. 22, 2014

(65) Prior Publication Data

US 2015/0014499 A1  Jan. 15, 2015

Related U.S. Application Data

(60) Provisional application No. 61/842,835, filed on Jul. 3, 2013.

(51) Int. Cl.
| | |
|---|---|
| *F41A 23/00* | (2006.01) |
| *F16M 13/00* | (2006.01) |
| *F16M 13/02* | (2006.01) |
| *F41C 33/04* | (2006.01) |
| *F41A 23/18* | (2006.01) |

(52) U.S. Cl.
CPC ........... *F16M 13/00* (2013.01); *F16M 13/022* (2013.01); *F41C 33/041* (2013.01); *F41A 23/18* (2013.01); *Y10S 224/912* (2013.01)

(58) Field of Classification Search
CPC .. A47F 5/0815; A47F 5/0006; A47F 5/0823; A47B 81/005; Y10S 224/912

USPC ....... 248/690, 205.3, 309.1, 316.7; 211/59.1, 211/64; 224/242, 243, 248, 301, 912

See application file for complete search history.

(56) References Cited

U.S. PATENT DOCUMENTS

| | | | | | |
|---|---|---|---|---|---|
| 4,022,361 | A | * | 5/1977 | Devlin | 224/192 |
| 4,052,058 | A | * | 10/1977 | Hintz | 273/446 |
| 4,691,396 | A | * | 9/1987 | Hoffman | A47C 21/00 211/64 |
| 5,111,545 | A | * | 5/1992 | Krozal | A47C 21/00 224/675 |
| 6,202,963 | B1 | * | 3/2001 | Derman | 248/110 |
| 6,220,557 | B1 | * | 4/2001 | Ziaylek et al. | 248/316.1 |
| 6,405,861 | B1 | * | 6/2002 | Siler | F41C 33/06 206/1.5 |
| 7,464,907 | B1 | * | 12/2008 | Lane | 248/205.3 |
| D622,992 | S | * | 9/2010 | Dodd | D6/552 |
| 8,403,278 | B1 | * | 3/2013 | Kasbohm | 248/206.5 |

* cited by examiner

*Primary Examiner* — Tan Le

(57) ABSTRACT

The purpose of the Holster Rest is to provide a secure mounting location for a holster and hand gun when the holster is not attached to a belt or clothing. The design and function allows the user to easily install and remove and relocate quickly to another location. The Holster Rest was designed to be lightweight, strong and portable The Injection Mold process for manufacture will use a plastic composite material which gives it strength and flexibility.

7 Claims, 6 Drawing Sheets

HOLSTER REST

CROSS-REFERENCE TO RELATED APPLICATIONS

This application claims the benefit of U.S. Provisional Application No. 61/842,835, Filed Jul. 3, 2013.

STATEMENT REGARDING FEDERALLY SPONSORED RESEARCH OR DEVELOPMENT

Not applicable

REFERENCE TO SEQUENTIAL LISTING, A TABLE, OR A COMPUTER PROGRAM LISTING APPENDIX SUBMITTED ON A COMPACT DISC

Not Applicable

BACKGROUND OF INVENTION

The most common method to use a gun holster is to attach it to a belt or piece of clothing. When the holster is not attached to a belt or piece of clothing, the most common place to have the holster and gun close by is to place it on the floor, desk, table or nightstand. The Holster Rest enables the user to place a gun holster onto the Holster Rest which is mounted vertically on a flat, non porous surface. The Holster Rest provides a method to mount your holster and gun securely within reach.

BRIEF SUMMARY OF THE INVENTION

The Holster Rest is designed to hold a holster in the proper vertical position, in which to secure a gun, in a location other than on a belt or piece of clothing on your person as to have it within reach of the user. The Holster Rest is vertically mounted to any flat, solid, non porous surface such as sealed wood, painted walls, laminates or steel by an adhesive strip. The Holster Rest has a flat vertical mounting base with 2 horizontal arms that extend perpendicular from the mounting base. A holster is placed within the Holster Rest by sliding the holster's belt loop(s) or belt clip(s) onto the arms of the Holster Rest. The Holster Rest resolves the issue of having a gun placed loosely on the floor, desk, table, or nightstand by having the gun mounted securely in a holster that was made for the gun.

DETAILED DESCRIPTION AND BEST MODE OF IMPLEMENTATION

Figure 1A:
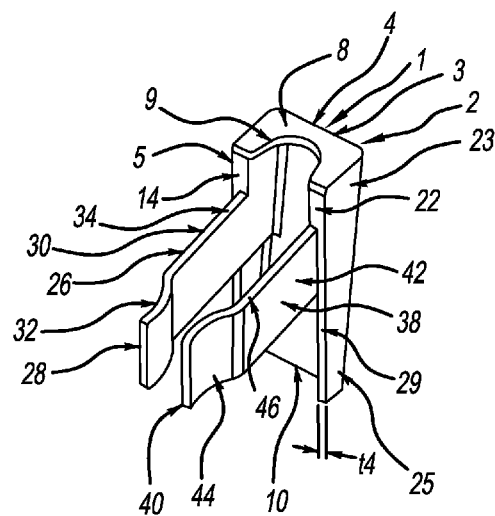
FIG. 1A is an isometric view of a Holster Rest in accordance with an embodiment described herein.
Figure 1B:
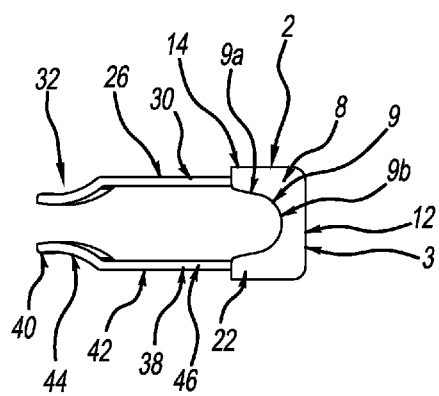
FIG. 1B is a top or first end view of the Holster Rest shown in FIG. 1A.
Figure 1C:
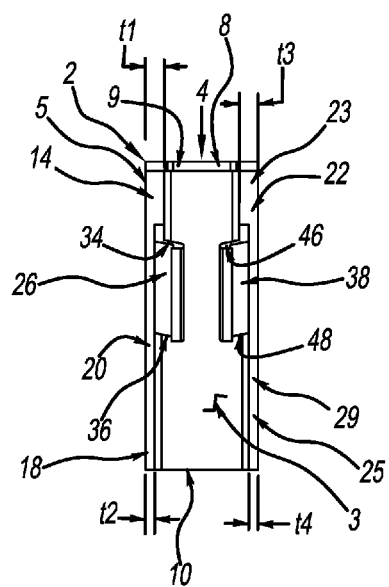
FIG. 1C is an end view of the Holster Rest shown in FIG. 1A.
Figure 1D:
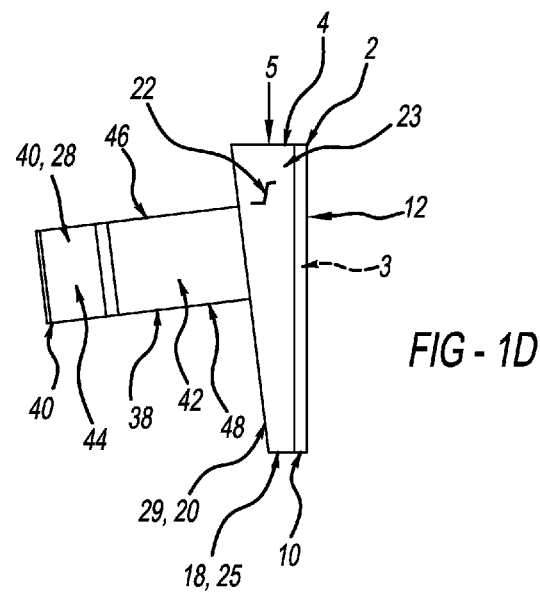
FIG. 1D is a side view of the Holster Rest shown in FIG. 1A.
Figure 2:
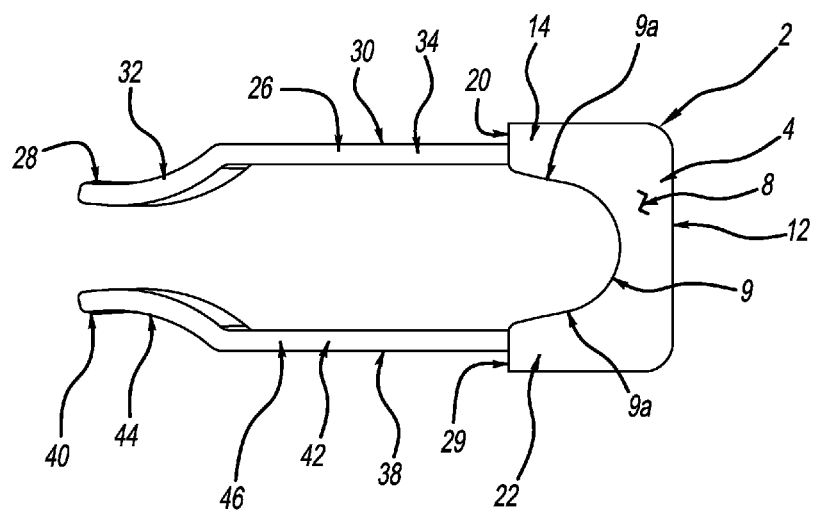
FIG. 2 is another Top or first end View of the Holster Rest shown in FIG. 1A.
Figure 3:
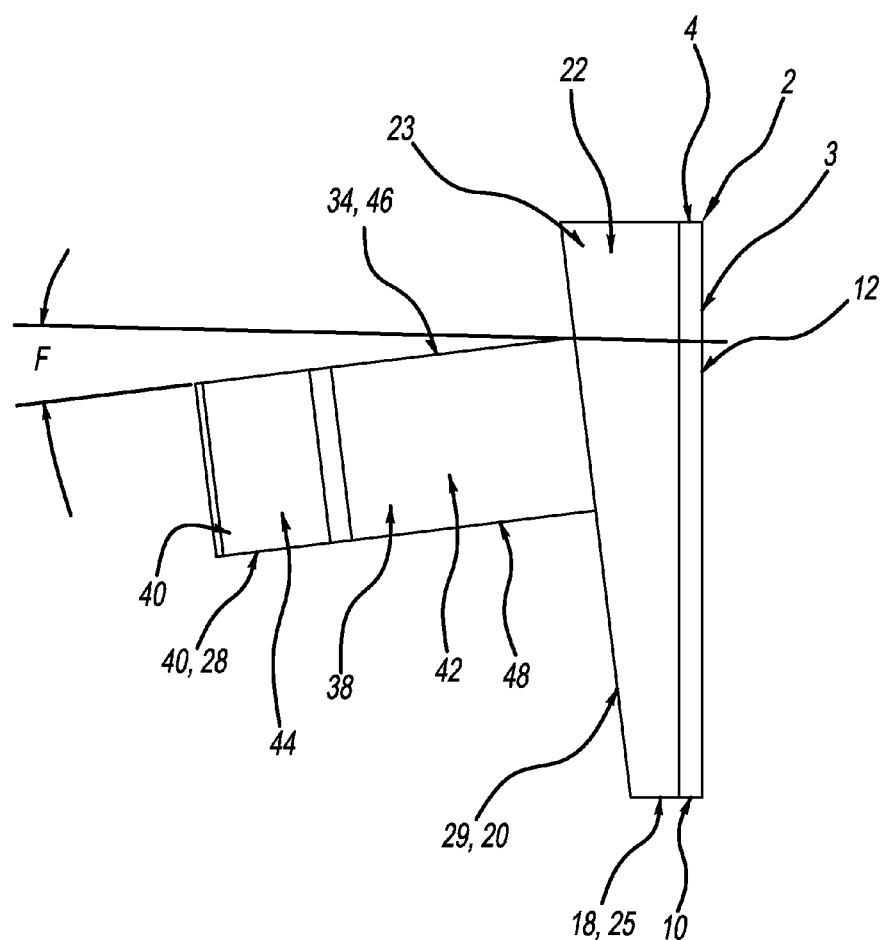
FIG. 3 is another Side View of the Holster Rest shown in FIG. 1A.
Figure 4:
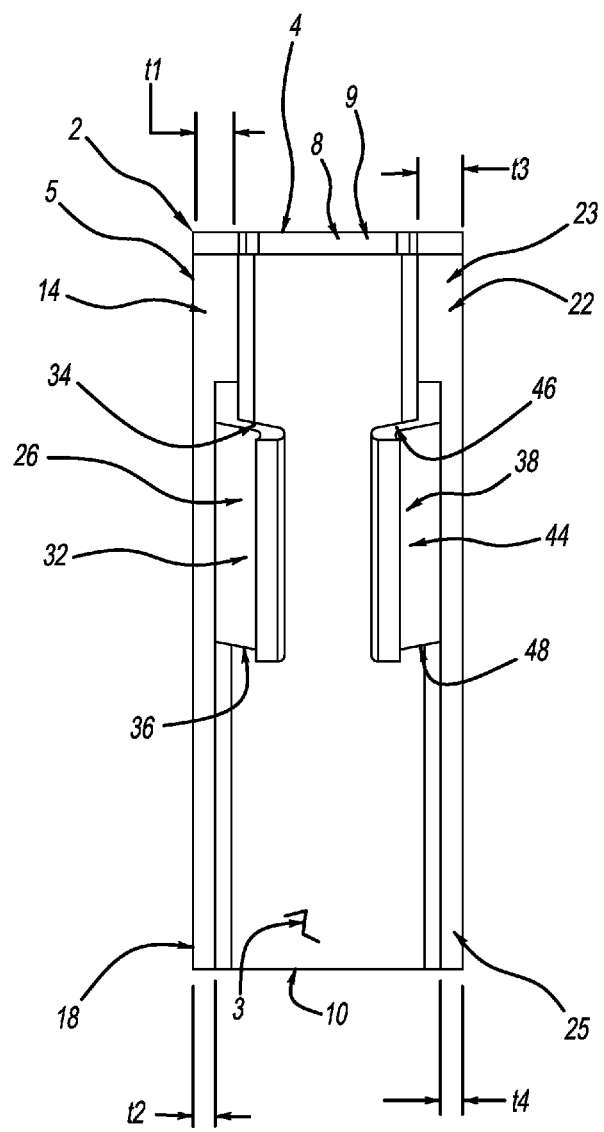
FIG. 4 is another End View of the Holster Rest shown in FIG. 1A.
Figure 5:
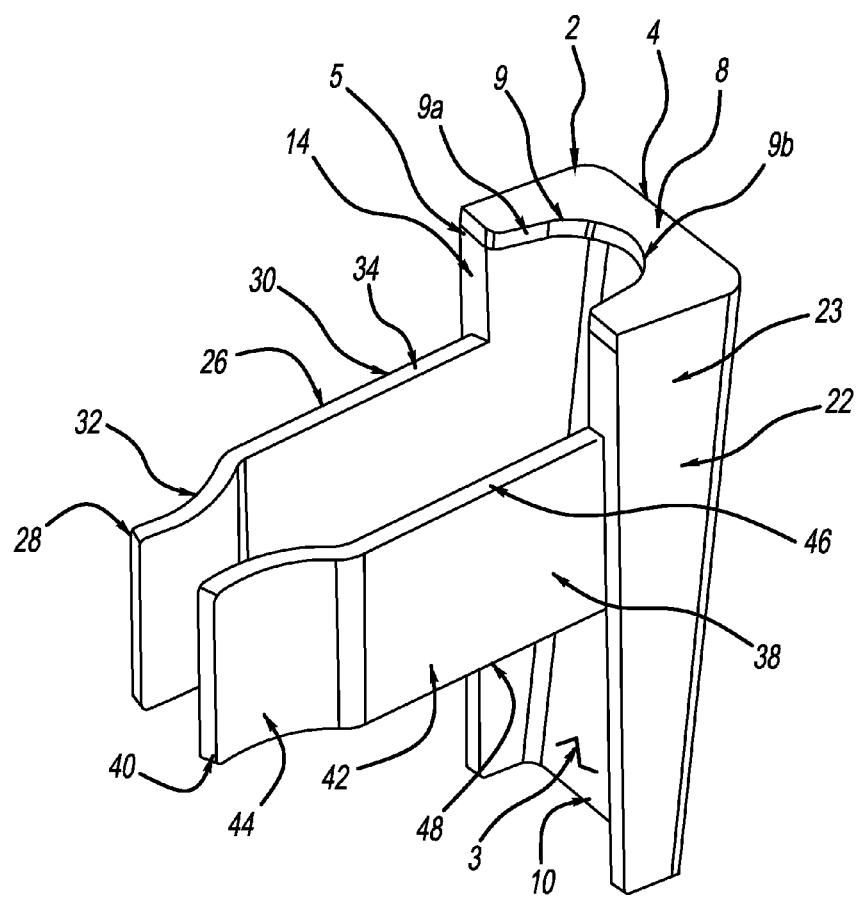
FIG. 5 is another Isometric View of the Holster Rest shown in FIG. 1A.
Figure 6:
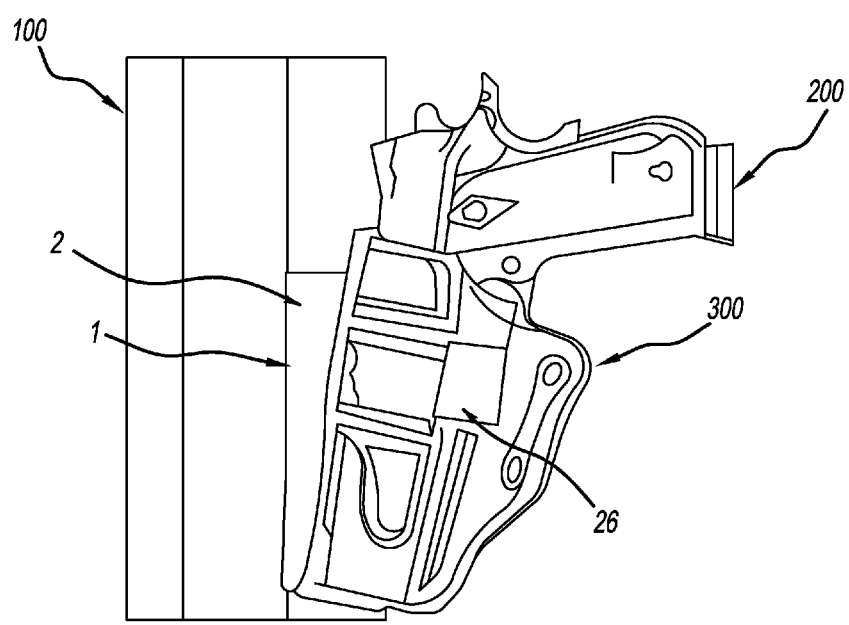
FIG. 6 is a side view of the Holster Rest of FIG. 1A Mounted with Holster and gun inserted whereas Element 100 is a wall, Element 200 is a gun, Element 300 is a holster and Element 1 is the Holster Rest.

Referring to FIGS. 1-6, in one embodiment, the holster rest 1 includes a mounting base 2 having a base portion 3 and a first wall 14 extending from the base portion 3. A first arm 26 extends from the first wall 14. The first wall 14 has a first end 5 and a second end 18 opposite the first end 5. The first arm 26 has a first edge 34 and a second edge 36 opposite the first edge 34. The second edge 36 resides between the first edge 34 and the first wall second end 18. The first wall 14 has a first thickness t1 from the first wall first end 5 to the first arm second edge 36, a second thickness t2 from the first arm second edge 36 to the first wall second end 18. In the embodiment shown, the second thickness t2 is less than the first thickness t1.

The holster rest 1 also has a second wall 22 extending from the base portion 3 opposite the first wall 14. A second arm 38 extends from the second wall 22. The second wall 22 has a first end 23 and a second end 25 opposite the first end 23. The second arm 38 has a first edge 46 and a second edge 48 opposite the first edge 46. The second arm second edge 48 resides between the second arm first edge 46 and the second wall second end 25. The second wall 22 has a first thickness t3 from the second wall first end 23 to the second arm second edge 48, and the second wall 22 has a second thickness t4 from the second arm second edge 48 to the second wall second end 25. In the embodiment shown, the second thickness t4 is less than the first thickness t3.

The holster rest 1 shown in FIGS. 1-6 also includes an endwall 8 connecting the base portion 3, the first wall first end 5 and the second wall first end 23. The endwall 8 has an opening 9 formed therein. In addition, the first arm 26 has a first curved portion 32 extending from an end of the first arm 26 to a location on the first arm 26 between the end of the first arm and the first wall 14. The second arm 38 has a second curved portion 44 extending from an end of the second arm 38 to a location on the second arm 38 between the end of the second arm 38 and the second wall 22. The first curved portion 32 curves in a direction toward the second curved portion 44.

In another aspect of the holster rest shown in FIGS. 1-6, the first arm first edge 34 extends from the mounting base 2 at an angle F that is non-perpendicular with respect to the mounting surface 12. In addition, the mounting base 2 has an edge 20 extending at an angle with respect to the mounting surface 12. The first arm first edge 34 extends from the mounting base edge 20 at an angle that is perpendicular with respect to the mounting base edge 20. Also, the second arm first edge 46 extends from the mounting base 2 at an angle F that is non-perpendicular with respect to the mounting surface 12. The mounting base 2 also includes another edge 29 extending at an angle with respect to the mounting surface 12. The second arm first edge 46 extends from the other mounting base edge 29 at an angle that is perpendicular with respect to the other mounting base edge 29.

The Holster Rest is made from a plastic composite material. It is formed in a single cavity Injection mold tool by means of the Injection Molding process. The disclosed elements and features of the Holster Rest function in such a manner as to enable additional uses of a holster that has not been found in prior art. The Holster Rest's construction of a plastic composite material provides a flexible, strong and secure placement of a holster and gun when not attached to a belt or clothing. The arms of the Holster Rest provide surface tension between it, and a holster while also providing the support required for the belt loop(s) or belt clip(s). The Holster Rest offers multiple opportunities for mounting locations for the various requirements of the user. The Holster Rest can be used with many holsters and semi automatic handguns.

To mount the Holster Rest, locate a flat, solid and non-porous surface. The Holster Rest is to be mounted in a vertical position so when the holster is in position within the Holster Rest, the gun barrel is pointed downward FIG. 6. Clean the mounting base of the Holster Rest, FIG. 1, Element 6, and the solid non porous surface, FIG. 6, Element 1, with Isopropyl Alcohol. Let both areas dry. Take the adhesive strip that is included, in your hand and orientate so the rounded portion is at the bottom.

Remove the paper cover on the adhesive strip and position the exposed adhesive strip on the Holster Rest by centering on the mounting base, 1" below the top of the Holster Rest. The rounded portion of the adhesive strip will extend 9/16" below the bottom of the Holster Rest Base. Apply hand pressure to the adhesive strip to insure adhesion of the adhesive strip to the mounting surface of the Holster Rest. Remove the remaining paper cover on the adhesive strip to expose the adhesive strip. Secure the Holster Rest to the proper mounting surface by placing the Holster Rest in the desired location and apply hand pressure to the inside surface of the mounting base on the Holster Rest. Do not apply pressure by pressing on the arms that extend from the Holster Rest. The Holster Rest is now mounted.

To place a holster in the Holster Rest take a holster in the vertical position and place the belt loop(s) or belt clip(s) of the holster onto the arm(s) of the Holster Rest. Continue to slide the holster forward; the arm(s) will pass through the belt loop(s) or belt clip(s). Slide the holster forward until fully engaged in the Holster Rest. The holster is now ready to use.

To remove the holster from the Holster Rest, remove gun from holster. Slide the holster straight back out of Holster Rest to disengage from the arms securing the holster.

To remove the Holster Rest from the mounting surface, remove the gun from the holster, then remove the holster from the Holster Rest. Locate the round tab at the bottom of the adhesive strip that secures the Holster Rest to the mounting surface. While holding the Holster Rest at the sides grasp the round tab of the adhesive strip and pull straight down. Continue stretching the adhesive strip tab in a downward direction 8"-15" until the adhesive strip releases the Holster Rest from the mounting location. The Holster Rest is now removed from the mounting surface. The Holster Rest can now be relocated to another location.

What is claimed is:

1. A holster rest comprising:
 a mounting base including a mounting surface; and
 a first arm extending from the mounting base,
 the first arm having a first edge extending from the mounting base at an angle (F) that is non-perpendicular with respect to the mounting surface, and the first arm having a second edge orthogonally extending from the mounting base wherein the mounting base includes a third edge extending at a non-perpendicular angle with respect to the mounting surface, said third edge longitudinally coextensive with said mounting base, and, the holster rest further comprising a second arm extending from the mounting base, the second arm having a first edge extending from the mounting base at an angle (F) that is non-perpendicular with respect to the mounting surface.

2. The holster rest of claim 1 wherein the mounting base includes another edge extending at an angle with respect to the mounting surface.

3. The holster rest of claim 2 wherein the second arm first edge extends from the other edge at an angle that is perpendicular with respect to the other edge.

4. A holster rest comprising:
 a mounting base including a base portion and a first wall extending from the base portion;
 a first arm extending from the first wall,
 the first wall having a first end and a second end opposite the first end, the first arm having a first edge and a second edge opposite the first edge, the second edge residing between the first edge and the first wall second end, wherein the first well has a first thickness (t1) from the first wall first end to the first arm second edge, and the first will has a second thickness (t2) from the first arm second edge to the first wall second end, said first and second thicknesses of unequal value;
 a second wall extending from the base portion opposite the first wall; and
 a second arm extending from the second wall,
 the second wall having a first end and a second end opposite the first end, the second arm having a first edge and a second edge opposite the first edge, the second arm second edge residing between the second arm first edge and the second wall second end, wherein the second wall has a first thickness (t3) from the second wall first end to the second arm second edge, and the second wall has a second thickness (t4) from the second arm second edge to the second wall second end,
 wherein the first arm has a first curved portion extending from an end of the first arm to a location on the first arm between the end of the first arm and the first wall, the second arm has a second curved portion extending from an end of the second arm to a location on the second arm between the end of the second arm and the second wall, and wherein the first curved portion curves in a direction toward the second curved portion.

5. The holster rest of claim 4 wherein the second thickness (t2) is less than the first thickness (t1).

6. The holster rest of claim 4 further comprising an endwall connecting the base portion, the first wall first end and the second wall first end, wherein the first wall, the second wall, and the base portion are formed as one piece.

7. The holster rest of claim 6 wherein the endwall has an opening formed therein.

* * * * *